US012580285B2

(12) United States Patent
Guen et al.

(10) Patent No.: US 12,580,285 B2
(45) Date of Patent: Mar. 17, 2026

(54) SECONDARY BATTERY

(71) Applicant: Samsung SDI Co., Ltd., Yongin-si (KR)

(72) Inventors: Min Hyung Guen, Yongin-si (KR); Hyun Young Lim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 668 days.

(21) Appl. No.: 17/999,702

(22) PCT Filed: Oct. 5, 2021

(86) PCT No.: PCT/KR2021/013589
§ 371 (c)(1),
(2) Date: Nov. 22, 2022

(87) PCT Pub. No.: WO2022/085991
PCT Pub. Date: Apr. 28, 2022

(65) Prior Publication Data
US 2023/0299439 A1 Sep. 21, 2023

(30) Foreign Application Priority Data
Oct. 23, 2020 (KR) ........................ 10-2020-0138684

(51) Int. Cl.
*H01M 50/588* (2021.01)
*H01M 10/052* (2010.01)
(Continued)

(52) U.S. Cl.
CPC ....... *H01M 50/588* (2021.01); *H01M 10/052* (2013.01); *H01M 50/15* (2021.01); *H01M 50/176* (2021.01)

(58) Field of Classification Search
CPC .. H01M 50/588; H01M 50/176; H01M 50/15; H01M 10/052
(Continued)

(56) References Cited

U.S. PATENT DOCUMENTS 10,367,186 B2 7/2019 Byun et al.
11,031,621 B2 6/2021 Guen
(Continued)

FOREIGN PATENT DOCUMENTS

CN 103943809 A 7/2014
CN 109088040 A 12/2018
(Continued)

OTHER PUBLICATIONS

Chinese Office Action, with English translation, dated Dec. 25, 2023, issued in corresponding Chinse Patent Application No. 202180031870.3, 13 pages.
(Continued)

*Primary Examiner* — James M Erwin
(74) *Attorney, Agent, or Firm* — Womble Bond Dickinson (US) LLP

(57) ABSTRACT

An embodiment of the present invention provides a secondary battery wherein, by positively charging a case by a high-resistance positive electrode charging member, an alloy (for example, a lithium aluminum (LiAl) alloy) is not formed on the inner surface of the case by an electrolyte (that is, the case is not corroded), and when a negative electrode terminal is short-circuited to a positive electrode case; a short-circuit current is limited. As an example, the secondary battery according to an embodiment of the present invention comprises: an electrode assembly; a case in which the electrode assembly is accommodated; a cap plate which is coupled to the case and seals the electrode assembly; a terminal which is connected to the electrode assembly
(Continued)

and exposed through the cap plate; and a charging member which is interposed between the cap plate and the terminal, wherein the charging member may comprise a conductive member interposed between the cap plate and the terminal, and an insulating member interposed between the conductive member, the cap plate, and the terminal.

12 Claims, 6 Drawing Sheets

(51) Int. Cl.
  *H01M 50/15*       (2021.01)
  *H01M 50/176*      (2021.01)
(58) Field of Classification Search
  USPC .......................................................... 429/181
  See application file for complete search history.

(56)                References Cited

U.S. PATENT DOCUMENTS

| 2011/0183165 | A1 | 7/2011 | Byun et al. | |
|---|---|---|---|---|
| 2011/0311863 | A1 | 12/2011 | Byun et al. | |
| 2014/0178744 | A1 | 6/2014 | Zhu et al. | |
| 2014/0205897 | A1 | 7/2014 | Byun et al. | |
| 2015/0111072 | A1 | 4/2015 | Han et al. | |
| 2015/0349320 | A1* | 12/2015 | Han | H01M 50/55 |
| | | | | 429/121 |

| 2015/0364731 | A1 | 12/2015 | Yoo et al. | |
|---|---|---|---|---|
| 2016/0380246 | A1 | 12/2016 | Kim et al. | |
| 2017/0062779 | A1 | 3/2017 | Byun et al. | |
| 2017/0084900 | A1* | 3/2017 | Baik | H01M 50/147 |
| 2017/0279098 | A1* | 9/2017 | Lee | H01M 50/3425 |
| 2018/0294447 | A1 | 10/2018 | Guo et al. | |
| 2018/0358648 | A1 | 12/2018 | Guen | |
| 2019/0067650 | A1* | 2/2019 | Li | H01M 50/172 |
| 2019/0214612 | A1* | 7/2019 | Guo | H01M 50/188 |
| 2019/0214625 | A1* | 7/2019 | Lee | H01M 50/567 |

FOREIGN PATENT DOCUMENTS

| JP | 2008-186591 | A | 8/2008 |
|---|---|---|---|
| KR | 10-1036070 | B1 | 5/2011 |
| KR | 10-2011-0137005 | A | 12/2011 |
| KR | 10-2014-0078812 | A | 6/2014 |
| KR | 10-2015-0045737 | A | 4/2015 |
| KR | 10-2015-0144600 | A | 12/2015 |
| KR | 10-2017-0000442 | A | 1/2017 |

OTHER PUBLICATIONS

Extended European Search Report issued in corresponding EP Application No. 21883063.6, dated May 15, 2025, 9 pages.
International Search Report of PCT/KR2021/013589, Jan. 3, 2022, 5 pages.

* cited by examiner

SECONDARY BATTERY

CROSS-REFERENCE TO RELATED APPLICATIONS

This application is a U.S. National Phase Patent Application of International Application Number PCT/KR2021/013589, filed on Oct. 5, 2021, which claims priority to Korean Patent Application Number 10-2020-0138684, filed on Oct. 23, 2020, the entire content of each of which is incorporated herein by reference.

TECHNICAL FIELD

An embodiment of the present invention relates to a secondary battery.

BACKGROUND ART

A secondary battery is a power storage system that provides excellent energy density for storing electrical energy in the form of chemical energy. Compared to non-rechargeable primary batteries, secondary batteries are rechargeable and are widely used in IT devices such as smartphones, cellular phones, laptops, and tablet PCs. Recently, in order to prevent environmental pollution, interest in electric vehicles has increased, and high-capacity secondary batteries are being adopted for electric vehicles accordingly. Such secondary batteries are required to have characteristics such as high density, high output, and stability.

The above information disclosed in this Background section is only for enhancement of understanding of the background of the invention and therefore it may contain information that does not constitute prior art.

DESCRIPTION OF EMBODIMENTS

Technical Problem

An embodiment of the present invention provides a secondary battery wherein, by positively charging a case by a high-resistance positive electrode charging member, an alloy (for example, a lithium aluminum (LiAl) alloy) is not formed on the inner surface of the case by an electrolyte (that is, the case is not corroded), and when a negative electrode terminal is short-circuited to a positive electrode case, a short-circuit current is limited.

In addition, an embodiment of the present invention provides a secondary battery wherein, by forming a positive electrode charging member by a double injection method, the positive electrode charging member is not deformed or damaged by an external welding heat source (that is, with durability improved).

In addition, an embodiment of the present invention provides a secondary battery wherein, since a positive electrode charging member has a protrusion and a recess, external foreign substances do not flow into the inside of a case, internal foreign substances of the case do not flow out to the outside, and the coupling force between the positive electrode charging member and the case is improved.

Solution to Problem

A secondary battery according to an embodiment of the present invention may include an electrode assembly, a case in which the electrode assembly is accommodated, a cap plate which is coupled to the case and seals the electrode assembly, a terminal which is connected to the electrode assembly and exposed through the cap plate, and a charging member which is interposed between the cap plate and the terminal, wherein the charging member may comprise a conductive member interposed between the cap plate and the terminal, and an insulating member interposed between the conductive member, the cap plate, and the terminal.

The conductive member may include a polymer and a conductive filler, the polymer including polyphenylene sulfide (PPS), polyacetylene (PA), polyphenylene vinylene (PPV), polypyrrole (PPY), polyaniline (PANI), polythiophene (PT), or poly 3, 4-etylenedioxythiophene (PEDOT), and the conductive filler may include carbon black, carbon fibers, or carbon nanotubes.

The electrical resistance of the conductive member may be 1 kΩ to 1000 MΩ.

The insulating member may include a polymer, which includes polycarbonate (PC), polyphenylene sulfide (PPS), polysulfone (PSF), polyethersulfone (PES), polyamide imide (PAI) or polyimide (PI).

The heat resistance temperature of the insulating member may be 120° C. to 300° C.

The terminal may include a terminal pole electrically connected to the electrode assembly and penetrating the cap plate, and a terminal plate coupled to the terminal pole and positioned on the cap plate, and the conductive member may contact the cap plate, the terminal pole, and the terminal plate.

The insulating member may contact the conductive member, the cap plate, and the terminal plate.

The secondary battery may further include a seal gasket interposed between the terminal pole and the cap plate, wherein the conductive member contacts the seal gasket.

The cap plate may include a first recess, and the conductive member may include a first protrusion coupled to the first recess.

The cap plate may include a second recess, the conductive member may include a second projection coupled to the second recess, and the insulating member may include a first protrusion coupled to the second recess.

The cap plate may include a first protrusion, and the conductive member may include a first recess coupled to the first protrusion.

The conductive member may include a second recess, and the insulating member may include a second protrusion coupled to the second recess.

Advantageous Effects of Disclosure

An embodiment of the present invention may provide a secondary battery wherein, by positively charging a case by a high-resistance positive electrode charging member, an alloy (for example, a lithium aluminum (LiAl) alloy) is not formed on the inner surface of the case by an electrolyte (that is, the case is not corroded), and when a negative electrode terminal is short-circuited to a positive electrode case, a short-circuit current is limited.

In addition, an embodiment of the present invention may provide a secondary battery wherein, by forming a positive electrode charging member by a double injection method, the positive electrode charging member is not deformed or damaged by an external welding heat source (that is, with durability improved).

In addition, an embodiment of the present invention may provide a secondary battery wherein, since a positive electrode charging member has a protrusion and a recess, external foreign substances do not flow into the inside of a case, internal foreign substances of the case do not flow out to the outside, and the coupling force between the positive electrode charging member and the case is improved.

MODES FOR CARRYING OUT THE INVENTION

Figure 1:
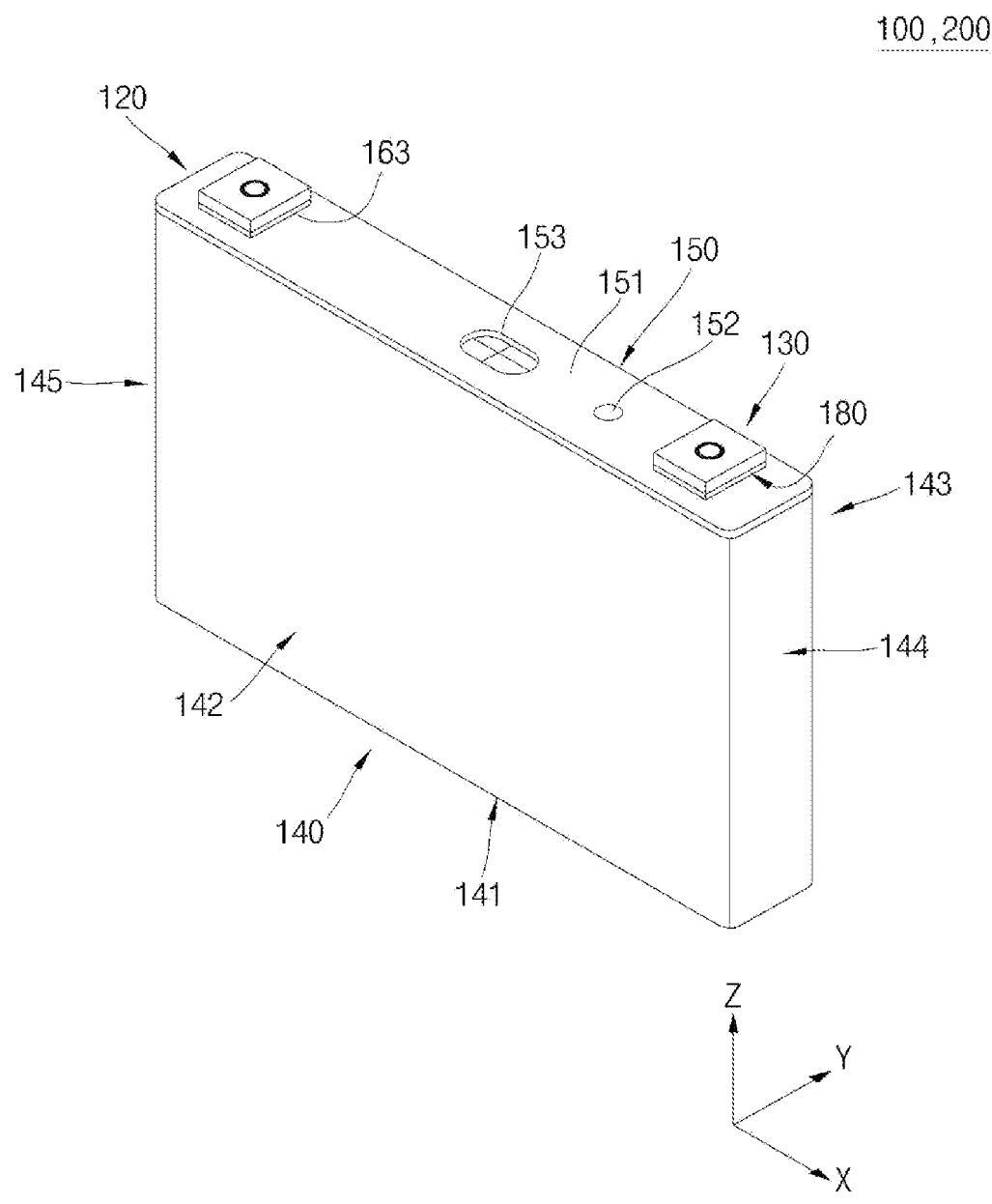
FIG. 1 is a perspective view of an example secondary battery according to an embodiment of the present invention.

Hereinafter, preferred embodiments of the present invention will be described in detail with reference to the accompanying drawings.

Examples of the present invention are provided to more completely explain the present invention to those skilled in the art, and the following examples may be modified in various other forms. The present invention, however, may be embodied in many different forms and should not be construed as being limited to the example (or exemplary) embodiments set forth herein. Rather, these example embodiments are provided so that this disclosure will be thorough and complete and will convey the aspects and features of the present invention to those skilled in the art.

In addition, in the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present therebetween such that the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms that the terms "comprise" and/or "comprising," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present invention.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the element or feature in the figures is turned over, elements described as "below" or "beneath" other elements or features would then be oriented "on" or "above" the other elements or features. Thus, the exemplary term "below" can encompass both an orientation of above and below.

FIG. 1 is a perspective view of a secondary battery 100, 200 according to an embodiment of the present invention. In the example shown in FIG. 1, the secondary batteries 100 and 200 include electrode assemblies 110 and 210 (see FIGS. 2A and 2B), a first terminal 120, a second terminal 130, a can 140, and a cap assembly 150, respectively.

An upper insulating member 163 may be interposed between the first terminal 120 and the cap assembly 150, and a charging member 180 may be interposed between the second terminal 130 and the cap assembly 150. Accordingly, the first terminal 120 and the cap assembly 150 may be electrically insulated (that is, separated) from each other. In addition, the second terminal 130 and the cap assembly 150 may be electrically connected to each other (that is, connected), and accordingly, the can 140 may be charged with, for example, a positive polarity (or a negative polarity).

In some examples, the first, second terminal 120 may penetrate through the cap assembly 150 and be exposed upward. In some examples, the first terminal 120 may include or be referred to as a negative terminal, and the second terminal 130 may include or be referred to as a positive terminal.

In some examples, the can 140 may be formed by a deep drawing process using a metal plate or a bending and welding process using a metal plate, and may be in the form of a hexahedron having a space in which the electrode assemblies 110 and 120 are accommodated and the cap assembly 150 can be seated. In some examples, the can 140 may include a rectangular bottom portion 141 having long sides and short sides, long sides 142 and 143 bent and extended from each of the long sides of the bottom portion 141 toward the cap assembly 150, and short side portions 144 and 145 extending from each of the short sides of the bottom portion 141 toward the cap assembly 150. In some examples, the can 140 may include or be referred to as a case, housing, or exterior material.

In some examples, the cap assembly 150 may include a cap plate 151, a plug 152, and a safety vent 153, which will be explained again below.

Figure 2A:
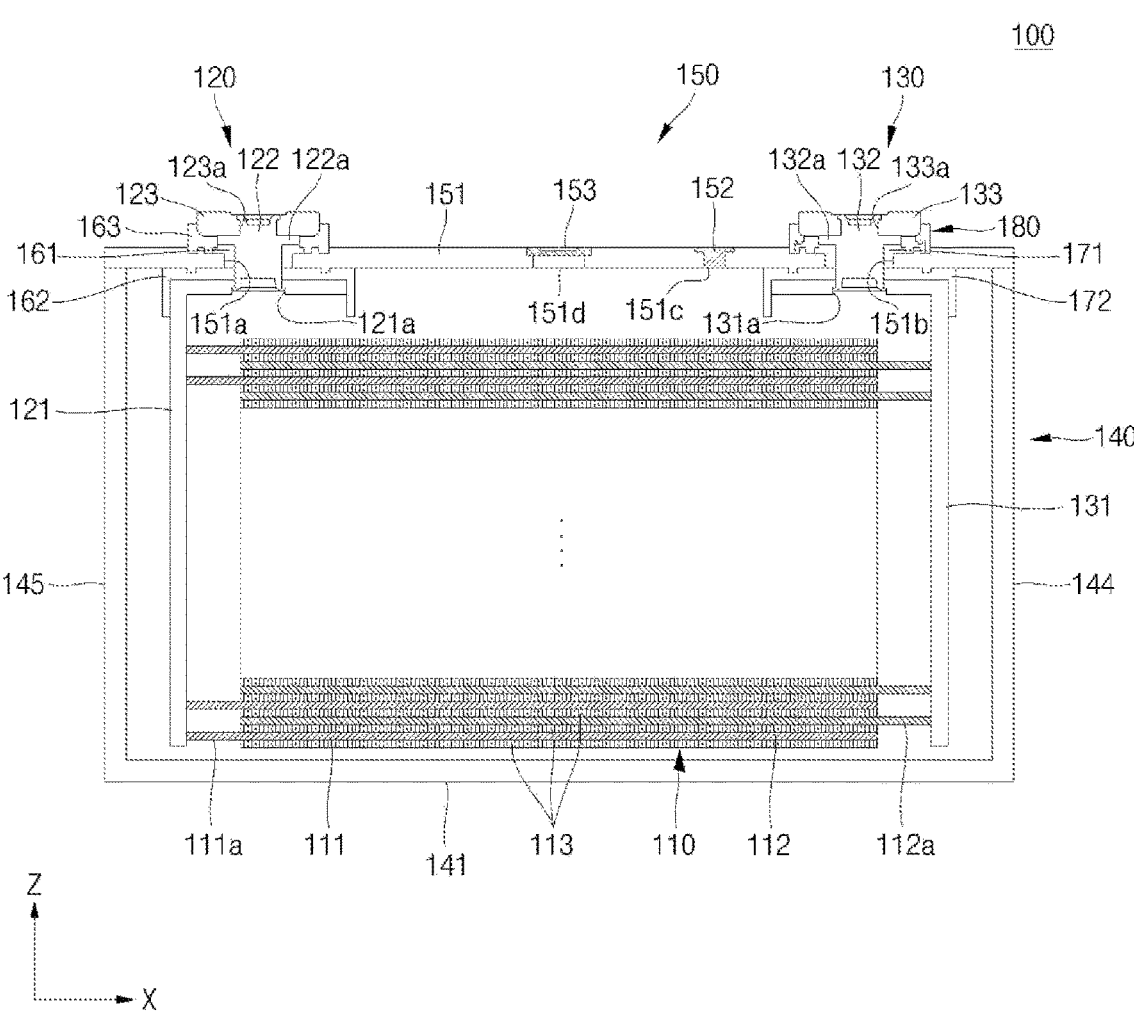
FIGS. 2A and 2B are cross-sectional views showing an example secondary battery shown in FIG. 1.
Figure 2B:
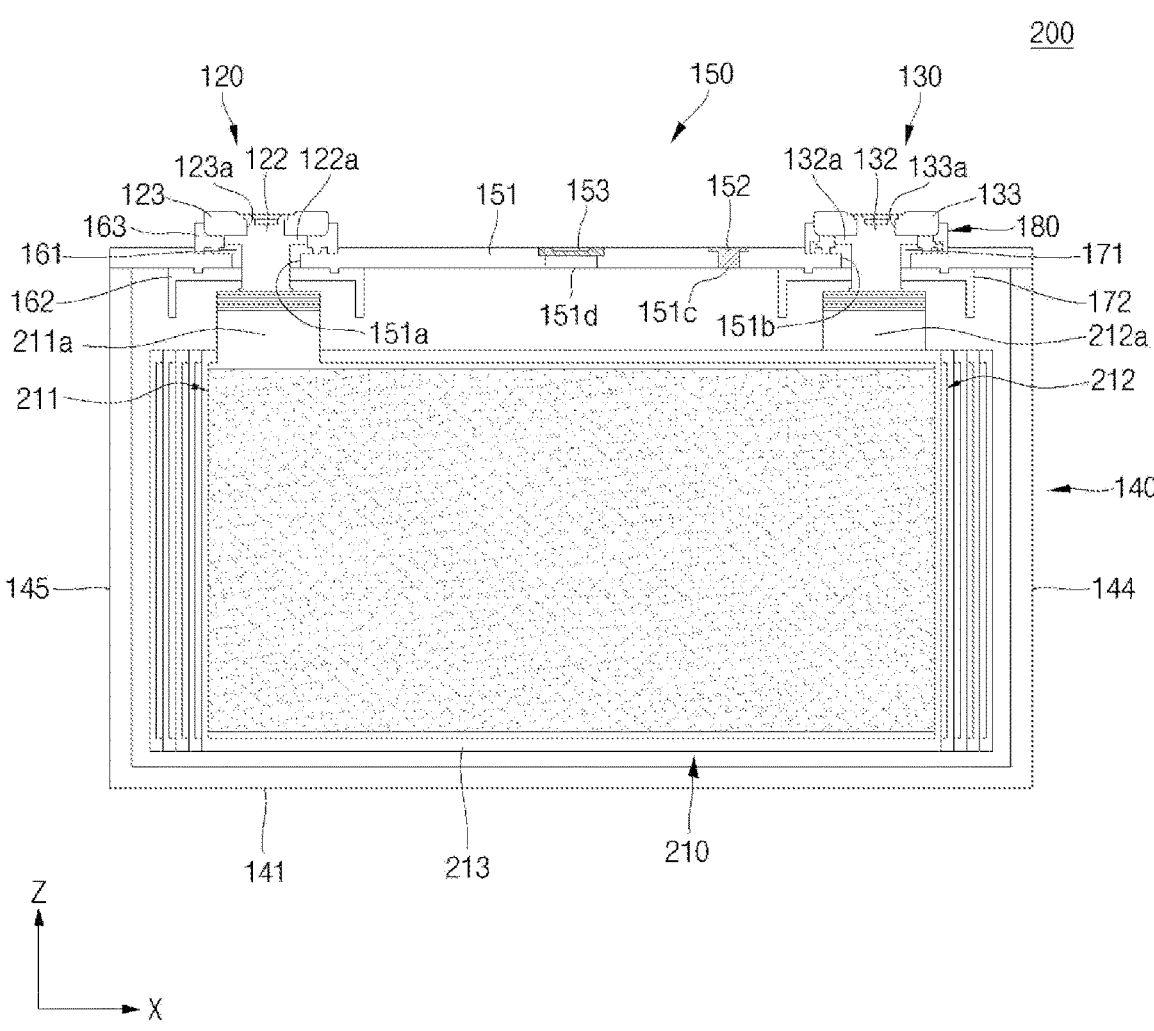

FIGS. 2A and 2B are cross-sectional views showing an example secondary battery 100, 200 shown in FIG. 1. In the example shown in FIG. 2A, the secondary battery 100 may include an electrode assembly 110 having a winding axis in the horizontal direction (that is, the direction approximately parallel to the longitudinal direction of the cap assembly 150), and in the example shown in FIG. 2B, the secondary battery 200 may include an electrode assembly 210 having a winding axis in the vertical direction (that is, the direction approximately perpendicular to the longitudinal direction of the cap assembly 150). In some examples, the electrode assemblies may include a stack type as well as a winding type.

The secondary battery 100 shown in FIG. 2A will be described. The electrode assembly 110 may be formed by winding or overlapping a stack of a first electrode plate 111, a separator 113, and a second electrode plate 112 formed in a thin plate or film shape. In some examples, the first electrode plate 111 may serve as a negative electrode, and the second electrode plate 112 may serve as a positive electrode. Of course, the reverse is also possible. In some examples, The first electrode plate 111 is formed by coating a first electrode active material, such as graphite or carbon, on a first electrode current collector formed of a metal foil, such as copper, a copper alloy, nickel, or a nickel alloy, and may include a first-electrode uncoated portion 111a to which the first electrode active material is not applied. In some examples, the second electrode plate 112 is formed by coating a second electrode active material, such as a transition metal oxide, on a second electrode current collector formed of a metal foil, such as aluminum or an aluminum alloy, and may include a second-electrode uncoated portion 112a to which the second electrode active material is not applied. In some examples, the separator 113 is positioned between the first electrode plate 111 and the second electrode plate 112 to prevent short circuit and enable the movement of lithium ions, and may include polyethylene, polypropylene, or a composite film of polyethylene and polypropylene. In addition, the separator 113 may include a functional film coated with an inorganic material layer on a porous polymer film. Also, the separator 113 may be replaced with an inorganic solid electrolyte, such as a sulfide-based, oxide-based or phosphate compound-based electrolyte that does not require a liquid or gel electrolyte. The first terminal 120 and the second terminal 130 electrically connected to the first electrode plate 111 and the second electrode plate 112, respectively, may be positioned at both ends of the electrode assembly 110 as described above. In some examples, the electrode assembly 110 may be accommodated in the can 140 together with an electrolyte. In some examples, the electrolyte may include a lithium salt, such as LiPF6, in an organic solvent, such as ethylene carbonate (EC), dimethyl carbonate (DMC), diethyl carbonate (DEC), or ethyl-methyl carbonate (EMC). Also, the electrolyte may be in a liquid or gel form. In some examples, when an inorganic solid electrolyte is used, the electrolyte may be omitted.

The first terminal 120 is formed of a metal and may be electrically connected to the first electrode plate 111. In some examples, the first terminal 120 may include a first current collector plate 121, a first terminal pole 122, and a first terminal plate 123. In some examples, the first current collector plate 121 may be in contact with the first-electrode uncoated portion 111a protruding from one end of the electrode assembly 110. Practically, the first current collector plate 121 may be welded to the first-electrode uncoated portion 111a. In some examples, the first current collector plate 121 is formed in an approximately "⌐" shape, and may have a terminal hole 121a formed in in upper portion thereof. In some examples, the first terminal pole 122 may be inserted into a terminal hole 121a to be riveted and/or welded. In some examples, the first current collector plate 121 may be made of copper or a copper alloy. In some examples, the first terminal pole 122 protrudes and extends upward a predetermined length through the cap plate 151 to be described later, and may be electrically connected to the first current collector plate 121 from the lower portion of the cap plate 151. In addition, in some examples, the first terminal pole 122 may protrude and extend to the upper portion of the cap plate 151 by a predetermined length, and at the same time, and may include a flange 122a that prevents the first terminal pole 122 from falling out of the lower portion of the cap plate 151. A region positioned below the flange 122a in the first terminal pole 122 may be inserted into the first terminal hole 121a of the first current collector plate 121 and then riveted and/or welded. In some examples, the first terminal pole 122 may be electrically insulated from the cap plate 151. In some examples, the first terminal pole 122 may be made of copper, a copper alloy, aluminum, or an aluminum alloy. The first terminal plate 123 may include a hole 123a, and the first terminal pole 122 may be coupled to the hole 123a and riveted and/or welded thereto. In some examples, boundaries of the first terminal pole 122 and the first terminal plate 123 that are upwardly exposed may be welded to each other. For example, laser beams may be provided to boundary regions of the first terminal pole 122 and the first terminal plate 123, thereby coupling the boundary regions after being welded to each other and then cooling. In some examples, a bus bar (not shown) made of aluminum or an aluminum alloy is welded to the first terminal plate 123, and thus a plurality of secondary batteries may be connected in series or in parallel.

The second terminal 130 is also formed of a metal and may be electrically connected to the second electrode plate 112. In some examples, the second terminal 130 may include a second current collector plate 131, a second terminal pole 132, and a second terminal plate 133. The second current collector plate 131 may be in contact with the second-electrode uncoated portion 112a protruding from one end of the electrode assembly 110. In some examples, the second current collector plate 131 121 is formed in an approximately "⌐" shape, and may have a terminal hole 131a formed in an upper portion thereof. In some examples, the second terminal pole 132 may be inserted into a terminal hole 131a to be riveted and/or welded. The second current collector plate 131 may be made of, for example, but not limited to, aluminum or an aluminum alloy. The second terminal pole 132 may protrude and extend upward a predetermined length through the cap plate 151 to be described later, and may be electrically connected to the second current collector plate 131 from the lower portion of the cap plate 151. The second terminal pole 132 may protrude and extend to the upper portion of the cap plate 151 by a predetermined length, and at the same time, and may include a flange 132a that prevents the second terminal pole 132 from falling out of the lower portion of the cap plate 151. A region positioned below the flange 132a in the second terminal pole 132 may be inserted into the second terminal hole 131a of the second current collector plate 131 and then riveted and/or welded. In some examples, the second terminal pole 132 may be made of aluminum or an aluminum alloy. The second terminal plate 133 may include a hole 133a, and the second terminal pole 132 may be coupled to the hole 133a. In addition, the second terminal pole 132 and the second terminal plate 133 may be riveted or welded to each other. In some examples, boundaries of the second terminal pole 132 and the second terminal plate 133 that are upwardly exposed may be welded to each other. For example, laser beams may be provided to boundary regions of the second terminal pole 132 and the second terminal plate 133, thereby coupling the boundary regions after being welded to each other and then cooling. Additionally, a bus bar (not shown) made of aluminum or an aluminum alloy is welded to the second terminal plate 133, and thus a plurality of secondary batteries may be connected in series or in parallel. In some examples, the second terminal plate 133 may be electrically connected to the cap plate 151, and thus, the cap plate 151 and the can 140 to be described below may have the same polarity as the second terminal 130 (for example, a positive polarity).

The cap assembly 150 may be coupled to the can 140. In some examples, the cap assembly 150 may include or be referred to as a cap plate 151. The cap plate 151 seals the space of the can 140, and may be formed of the same material as the can 140. In some examples, the cap plate 151 may be coupled to the can 140 by laser welding. In some examples, the cap plate 151 may have the same polarity as the second terminal 130 as described above, and thus the cap plate 151 and the can 140 may have the same polarity. In some examples, the cap plate 151 may include a first through-hole 151a through which the first terminal pole 122 passes and a second through-hole 151b through which the second terminal pole 132 passes. In some examples, the cap plate 151 may further include an injection hole 151c into which an electrolyte is injected and a vent hole 151d in which a safety vent is installed. In some examples, the plug 152 may block the injection hole 151c to prevent the electrolyte contained in the can 140 from leaking. In some examples, the plug 152 may be laser-welded to the cap plate 151 after being coupled to the injection hole 151c. In some examples, the safety vent 153 blocks the vent hole 151d, and when the internal pressure of the can 140 becomes higher than the set pressure, the internal high-pressure gas may be discharged to the outside. In some examples, after being coupled to the vent hole 151d, the safety vent 153 may be laser-welded to the cap plate 151.

In some examples, an insulating seal gasket 161 may be interposed between the first terminal pole 122 and the first through-hole 151a of the cap plate 151. In some examples, a lower insulating member 162 may be interposed between the first current collector plate 121 and the cap plate 151. In some examples, an upper insulating member 163 may be interposed between the first terminal plate 123 and the cap plate 151. Accordingly, the first terminal 120 may be electrically insulated (separated) from the cap plate 151.

In some examples, an insulating seal gasket 171 may be interposed between the second terminal pole 132 and the second through-hole 151b of the cap plate 151. In some examples, a lower insulating member 172 may be interposed between the second current collector plate 131 and the cap plate 151. In some examples, a charging member 180 may be interposed between the second terminal plate 133 and the cap plate 151. Accordingly, the second terminal 130 may be electrically connected to the cap plate 151.

The secondary battery 200 shown in FIG. 2B will now be described. The secondary battery 200 has a different structure from the secondary battery 100 of the above-described embodiment with respect to an electrode assembly 220 and a connection relationship between the electrode assembly 220 and the terminals 120 and 130. A first electrode tab 211a may be interposed between the electrode assembly 210 and the first terminal 120, and a second electrode tab 212a may be interposed between the electrode assembly 210 and the second terminal 130. That is, the first electrode tab 211a may extend from an upper end of the electrode assembly 210 toward a lower end of the first terminal pole 122 to be electrically connected to or welded to the first terminal pole 122. Also, the second electrode tab 212a may extend from an upper end of the electrode assembly 210 toward a lower end of the second terminal pole 132 to be electrically connected to or welded to the second terminal pole 132. Practically, the first electrode tab 211a may be a first uncoated portion itself, to which the first active material is not applied, in the first electrode plate 211 of the electrode assembly 210, or may be a separate member connected to the first uncoated portion. Here, the material of the first uncoated portion is the same as that of the first electrode plate, and the material of the separate member may be one selected from nickel, a nickel alloy, copper, a copper alloy, aluminum, an aluminum alloy, and equivalents thereof. In addition, practically, the second electrode tab 212a may be a second uncoated portion itself, to which the second active material is not applied, in the second electrode plate 212 of the electrode assembly 210, or may be a separate member connected to the second uncoated portion.

Figure 3A:
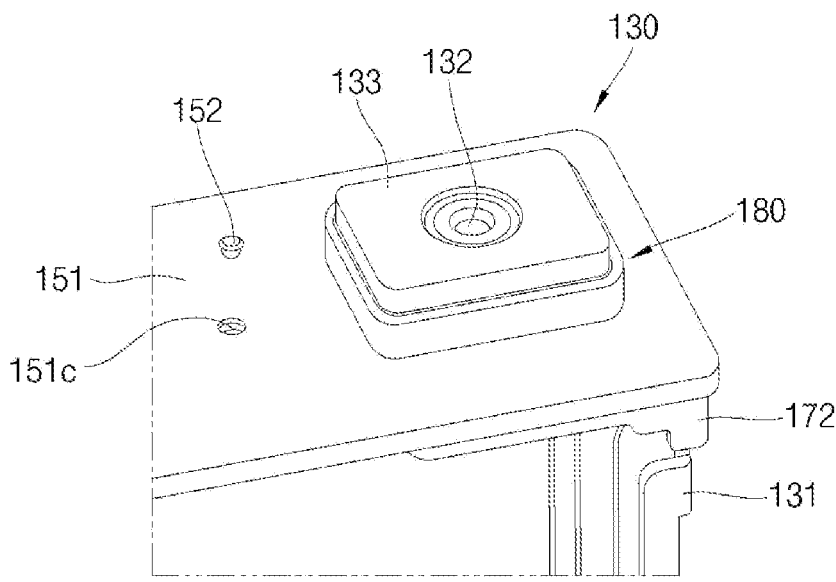
FIGS. 3A and 3B are a perspective view and a cross-sectional view showing an example positive electrode terminal and an example an example positive electrode charging member in the example secondary battery according to an embodiment of the present invention.
Figure 3B:
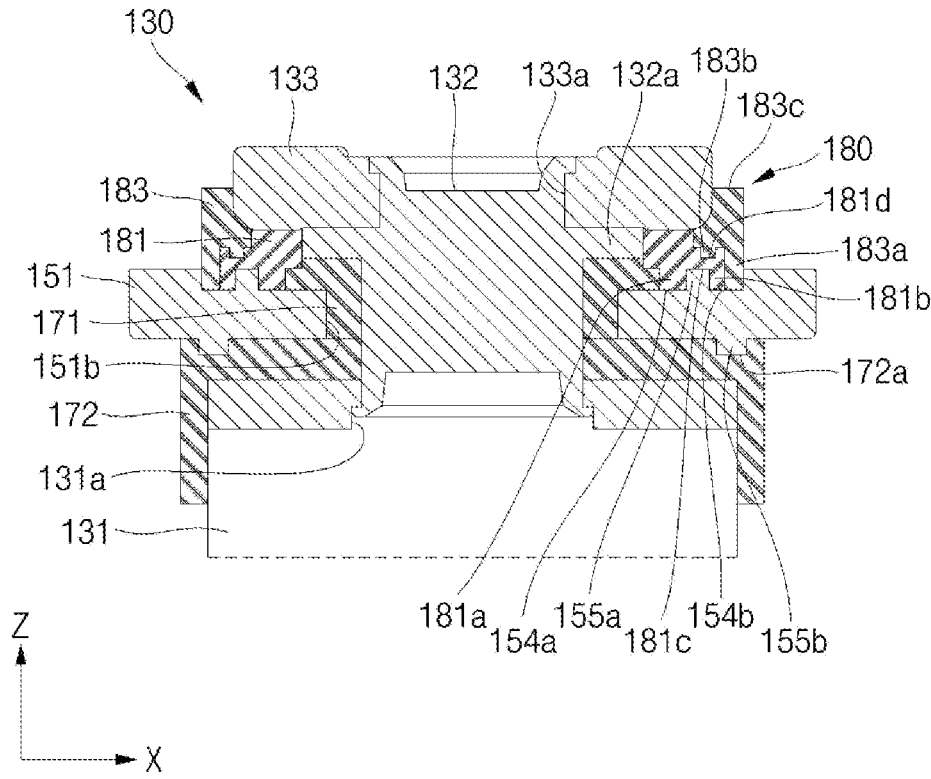

FIGS. 3A and 3B are a perspective view and a cross-sectional view showing an example positive electrode terminal 130 and an example positive electrode charging member 180 in the example secondary battery 100 according to an embodiment of the present invention. Such a structure may be applied to the example secondary battery 200 in the same or similar manner.

As shown in FIGS. 3A and 3B, the positive electrode charging member 180 may be interposed between the cap plate 151 and the positive electrode terminal 130. In some examples, the charging member 180 may include a conductive member 181 and an insulating member 183 interposed between the cap plate 151 and the positive terminal 130. In some examples, the conductive member 181 may include a polymer and a conductive filler.

In some examples, the polymer may include polyphenylene sulfide (PPS), polyacetylene (PA), polyphenylene vinylene (PPV), polypyrrole (PPY), polyaniline (PANI), polythiophene (PT), or poly 3, 4-etylenedioxythiophene (PEDOT). In some examples, the conductive filler may include carbon black, carbon fibers, or carbon nanotubes In some examples, the electrical resistance of the conductive member 181 may be approximately 1 kΩ to approximately 1000 MΩ. In some examples, when the polymer itself has conductivity, the conductive filler may be omitted. In some examples, when the conductive filler is dispersed in the polymer, the conductive member 181 may be black.

In some examples, the insulating member 183 may include a polymer, wherein the polymer may include polycarbonate (PC), polyphenylene sulfide (PPS), polysulfone (PSF), polyethersulfone (PES), polyamide imide (PAI), or polyimide (PI). In some examples, the heat resistance temperature of the insulating member 183 may be approximately 120° C. to approximately 300° C., which is higher than the heat resistance temperature of the conductive member 181.

In some examples, the conductive member 181 may first be formed by injection molding, and the insulating member 183 may then be formed by injection molding while surrounding the conductive member 181. In some examples, the charging member 180 may be formed by a double injection process.

In this way, as the positive electrode terminal 130 and the cap plate 151 are electrically connected by the positive electrode charging member 180, the cap plate 151 and the can 140 may be positively charged. Therefore, an alloy (an alloy (for example, a lithium aluminum (LiAl) alloy) is not formed on the inner surface of the case 140 by an electrolyte containing lithium ions, and thus corrosion can be prevented on the inner surface of the can 140. In addition, since the positive electrode charging member 180 has relatively high electrical resistance, even if the negative terminal 120 is short-circuited to the can 140 of the positive electrode, the positive electrode charging member 180 mainly consumes a short-circuit current. In some examples, when the negative terminal 120 is short-circuited to the can 140 of the positive electrode, the positive electrode charging member 180 mainly consumes energy of the battery 100, thereby preventing the battery 100 from igniting.

In addition, since the insulating member 183 having a relatively high heat resistance temperature wraps the conductive member 181, the conductive member 181 is not deformed or damaged by an external welding heat source. In other words, after the plug 152 is coupled to the injection hole 151c of the cap plate 151, the plug 152 may be welded to the cap plate 151, and the insulating member 183 may block the heat generated at this time, so that the heat is not transmitted to the conductive member 181. Accordingly, the positive electrode charging member 180 is not damaged or deformed by the heat generated during welding of the plug 152 positioned between the safety vent 153 and the positive electrode terminal 130.

In some examples, the conductive member 181 may contact the cap plate 151, the terminal pole 132, and the terminal plate 133. In some examples, the conductive member 181 may contact the flange 132a. In some examples, the conductive member 181 may further contact the seal gasket 171. In some examples, the insulating member 183 may contact the cap plate 151, the conductive member 181, and the terminal plate 133.

In some examples, the cap plate 151 may further include a first recess 154a formed on an upper surface, and the conductive member 181 may further include a first protrusion 181a coupled to the first recess 154a.

In some examples, the cap plate 151 may further include a second recess 154b formed on the upper surface as an exterior side of the first recess 154a, the conductive member 181 may further include a second protrusion 181b coupled to the second recess 154b, and the insulating member 183 may further include a first protrusion 183a coupled to the second recess 154b. In some examples, in a state in which the second protrusion 181b of the conductive member 181 and the first protrusion 183a of the insulating member 183 are in contact with each other, the second protrusion 181b and the first protrusion 183a may be simultaneously coupled to the second recess 154b of the cap plate 151.

In some examples, the cap plate 151 may further include a first protrusion 155a formed between the first recess 154a and the second recess 154b, and the conductive member 181 may further include a first recess 181c coupled to the first protrusion 155a of the cap plate 151. In some examples, the conductive member 181 may further include a second recess 181d formed on an upper surface, and the insulating member 183 may further include a second protrusion 183b coupled to the second recess 181d. In some examples, the insulating member 183 may further include a third protrusion 183c formed on an upper surface, and the third protrusion 183c may contact the outer surface of the terminal plate 133.

In this way, the first and second recesses 154a and 154b and the first protrusion 155a are provided to the cap plate 151, the first and second protrusions 181a and 181b and the first recess 181c are provided to the conductive member 181, and the first protrusion 183a is provided to the insulating member 183, so that the movement path of foreign substances is lengthened, thereby preventing the foreign substances from flowing into the inside of the can 140 and preventing internal foreign substances of the can 140 from flowing out. In addition, the second recess 181d is provided on the upper surface of the conductive member 181 and the second protrusion 183b is provided on the lower surface of the insulating member 183 to then be coupled to each other, thereby improving a coupling force between the conductive member 181 and the insulating member 183.

In some examples, the cap plate 151 may further include a second protrusion 155b formed on the lower surface, and the lower insulating member 172 may further include a recess 172a formed on the upper surface. In addition, since the recess 172a of the lower insulating member 172 is coupled to the second protrusion 155b of the cap plate 151, the coupling force between the cap plate 151 and the lower insulating member 172 may be improved.

Figure 4A:
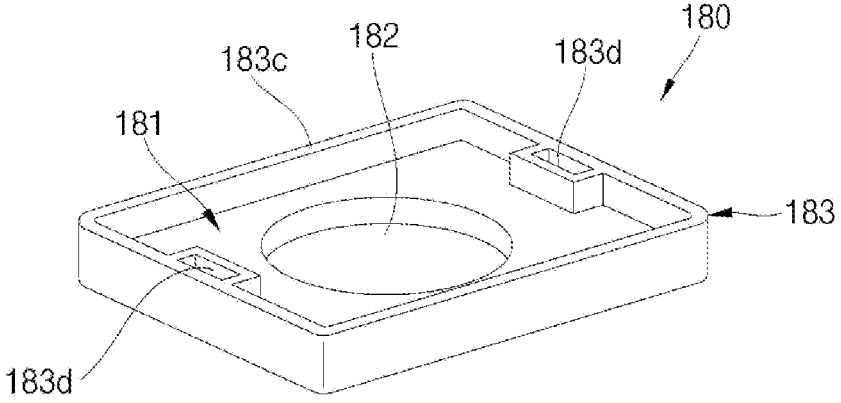
FIGS. 4A, 4B, and 4C are a top perspective view, a top plan view, and a bottom plan view showing the example positive electrode charging member in the example secondary battery according to an embodiment of the present invention.
Figure 4B:
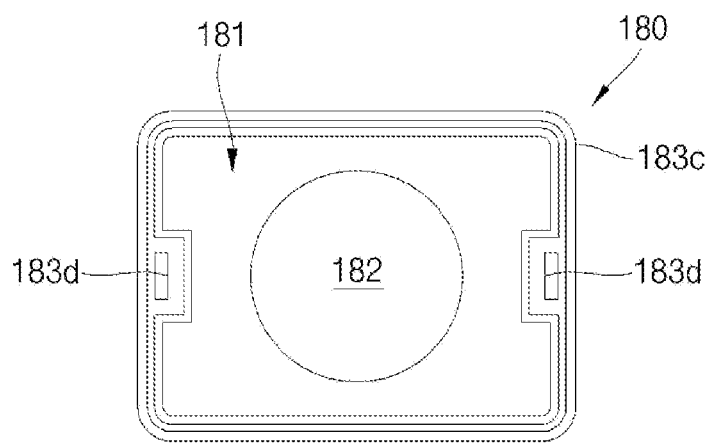
Figure 4C:
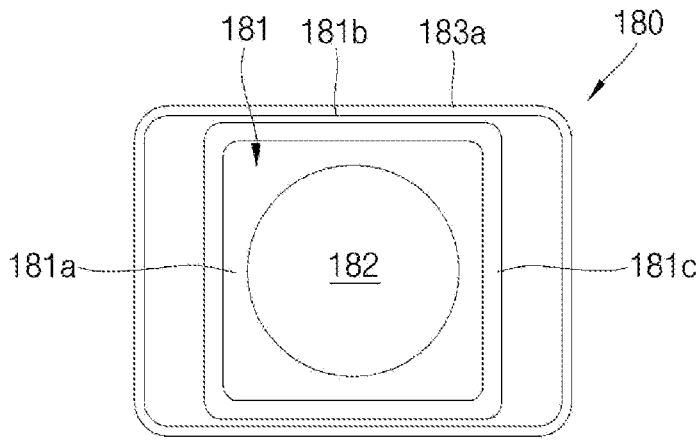

FIGS. 4A, 4B, and 4C are a top perspective view, a top plan view, and a bottom plan view showing the example positive electrode charging member 180 in the example secondary battery 100 according to an embodiment of the present invention. The positive electrode charging member 180 may also be applied in the same or similar manner to the above-described secondary battery 200.

As shown in FIGS. 4A, 4B, and 4C, the positive electrode charging member 180 may further include a through-hole 182 formed in the center of the conductive member 181. The terminal pole 132 may pass through the through-hole 182 of the conductive member 181 and may contact the inner surface of the through-hole 182.

In some examples, the insulating member 183 may further include fourth protrusions 183d formed on opposite sides. The fourth protrusions 183d may be shaped to protrude inwardly from the third protrusion 183c (that is, the square circumference) of the insulating member 183. The fourth protrusion 183d of the insulating member 183 is coupled to a recess (not shown) formed on the lower surface of the terminal plate 133 to prevent the terminal plate 133 and the insulating member 183 from rotating relative to each other. In some examples, first recess 181c formed in the conductive member 181 may have a substantially rectangular line shape. A first protrusion 181a may be formed inside the first recess 181c, and a second protrusion 181b may be formed outside the first recess 181c.

In some examples, the first protrusion 183a of the insulating member 183 may have a substantially rectangular line shape by wrapping the outside of the second protrusion 181b of the conductive member 181. The positive electrode charging member 180 having such a structure is coupled to the first and second recesses 154a and 154b and the first protrusion 155a of the cap plate 151, thereby preventing the positive electrode charging member 180 from rotating on the cap plate 151.

While the foregoing embodiment has been provided for carrying out the secondary battery according to the present invention, it should be understood that the embodiment described herein should be considered in a descriptive sense only and not for purposes of limitation, and various changes in form and details may be made therein without departing from the spirit and scope of the disclosure as defined by the following claims.

The invention claimed is:

1. A secondary battery comprising:
an electrode assembly;
a case in which the electrode assembly is accommodated;
a cap plate coupled to the case and sealing the electrode assembly;
a terminal connected to the electrode assembly and exposed through the cap plate; and
a charging member between the cap plate and the terminal, wherein the charging member comprises a conductive member between the cap plate and the terminal, and an insulating member between the conductive member, the cap plate, and the terminal.

2. The secondary battery of claim 1, wherein the conductive member comprises a polymer and a conductive filler, the polymer comprising polyphenylene sulfide (PPS), polyacetylene (PA), polyphenylene vinylene (PPV), polypyrrole (PPY), polyaniline (PANI), polythiophene (PT), or poly 3, 4-ethylenedioxythiophene (PEDOT), and the conductive filler comprising carbon black, carbon fibers, or carbon nanotubes.

3. The secondary battery of claim 1, wherein an electrical resistance of the conductive member is 1 kΩ to 1000 MΩ.

4. The secondary battery of claim 1, wherein the insulating member includes a polymer, which includes polycarbonate (PC), polyphenylene sulfide (PPS), polysulfone (PSF), polyethersulfone (PES), polyamide imide (PAI) or polyimide (PI).

5. The secondary battery of claim 1, wherein a heat resistance temperature of the insulating member is 120° C. to 300° C.

6. The secondary battery of claim 1, wherein the terminal comprises a terminal pole electrically connected to the electrode assembly and penetrating the cap plate, and a terminal plate coupled to the terminal pole and positioned on the cap plate, and the conductive member contacts the cap plate, the terminal pole, and the terminal plate.

7. The secondary battery of claim 6, wherein the insulating member contacts the conductive member, the cap plate, and the terminal plate.

8. The secondary battery of claim 6, further comprising a seal gasket interposed between the terminal pole and the cap plate, wherein the conductive member contacts the seal gasket.

9. The secondary battery of claim 1, wherein the cap plate defines a first recess, and the conductive member further comprises a first protrusion coupled to the first recess.

10. The secondary battery of claim 1, wherein the cap plate defines a second recess, the conductive member further comprises a second projection coupled to the second recess, and the insulating member further comprises a first protrusion coupled to the second recess.

11. The secondary battery of claim 1, wherein the cap plate further comprises a first protrusion, and the conductive member defines a first recess coupled to the first protrusion.

12. The secondary battery of claim 1, wherein the conductive member defines a second recess, and the insulating member further comprises a second protrusion coupled to the second recess.

* * * * *